United States Patent
Lovato et al.

(10) Patent No.: US 12,174,336 B2
(45) Date of Patent: Dec. 24, 2024

(54) METHOD AND SYSTEM FOR ALIGNING EMITTERS AND RECEIVERS OF A LIGHT BARRIER BY MEANS OF VISIBLE LIGHT

(71) Applicant: Datalogic IP Tech, S.r.l., Bologna (IT)

(72) Inventors: Piero Lovato, Bologna (IT); Daniele Fioretti, Bologna (IT); Michele Macchia, Bologna (IT); Andrea Locarni, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 0 days.

(21) Appl. No.: 18/191,200

(22) Filed: Mar. 28, 2023

(65) Prior Publication Data

US 2023/0305184 A1    Sep. 28, 2023

(30) Foreign Application Priority Data

Mar. 28, 2022   (EP) .................................... 22164743

(51) Int. Cl.
*G01V 8/22*    (2006.01)
(52) U.S. Cl.
CPC ..................................... *G01V 8/22* (2013.01)
(58) Field of Classification Search
CPC ... G01V 8/20; G01V 8/10; G01V 8/12; G01V 8/14; G01V 8/22; F16P 3/144; F21V 15/01; F21V 21/14; F21V 5/04; H01L 25/167; H01L 31/12; H01L 33/08
See application file for complete search history.

(56) References Cited

U.S. PATENT DOCUMENTS

| | | | | | |
|---|---|---|---|---|---|
| 3,623,057 | A | * | 11/1971 | Hedin ................... | G08B 13/184 340/557 |
| 4,004,805 | A | * | 1/1977 | Chen ................... | A63B 71/0605 250/221 |
| 6,239,423 | B1 | * | 5/2001 | Hama ...................... | G01V 8/20 250/221 |
| 2002/0154423 | A1 | * | 10/2002 | Gubela, Sr. ............ | G02B 5/124 359/834 |

(Continued)

FOREIGN PATENT DOCUMENTS

| DE | 202006012454 U1 | 10/2006 |
|---|---|---|
| EP | 0964273 A2 | 12/1999 |

(Continued)

OTHER PUBLICATIONS

European Search Report of counterpart EP Application No. 22164743.1 dated Sep. 9, 2022.

(Continued)

*Primary Examiner* — Thanh Luu
*Assistant Examiner* — Monica T Taba
(74) *Attorney, Agent, or Firm* — Cozen O'Connor

(57) ABSTRACT

An emitter and a receiver in a light barrier system are aligned by placing one or more retroreflective elements in a vicinity of the receiver such that a beam of visible light emitted by an optical alignment element impinges on a retroreflective element when the light beam emitted by the emitter impinges on the receiver. The optical alignment element is activated to emit a beam of visible light, and optical components of the system are adjusted so that the visible beam emitted by the optical alignment element impinges on, and is reflected by, the retroreflective element.

15 Claims, 4 Drawing Sheets

(56) References Cited

U.S. PATENT DOCUMENTS

| | | | | |
|---|---|---|---|---|
| 2012/0086951 A1* | 4/2012 | Kietz | ........................ | G01V 8/20 |
| | | | | 250/578.1 |
| 2016/0043801 A1* | 2/2016 | Grimm | .............. | H04B 10/1143 |
| | | | | 398/131 |
| 2017/0016763 A1* | 1/2017 | Horsch | ................. | G01J 1/0209 |
| 2017/0315262 A1* | 11/2017 | Collins | .................... | G01V 8/20 |

FOREIGN PATENT DOCUMENTS

| | | | | |
|---|---|---|---|---|
| EP | 1437542 | B1 | 9/2006 | |
| EP | 2226652 | B1 | 11/2013 | |
| EP | 3128348 | A1 | 2/2017 | |
| EP | 3770647 | A1 * | 1/2021 | ............... G01V 8/20 |

OTHER PUBLICATIONS https://cdn.sick.com/media/docs/5/95/195/Operating_instructions_M4000_Standard_and_M4000_Standard_A_P_en_IM0012195.PDF.

https://leuze.ru/download/pdf/37a263e65f95956a03fd8139fd03fc41.pdf.

\* cited by examiner

METHOD AND SYSTEM FOR ALIGNING EMITTERS AND RECEIVERS OF A LIGHT BARRIER BY MEANS OF VISIBLE LIGHT

PRIOR APPLICATION

This application claims priority under 35 U.S.C. § 119 to European Patent Application No. EP 22164743.1, filed Mar. 28, 2022, which is incorporated by reference into the present disclosure.

TECHNOLOGICAL FIELD

The present application relates to light barriers, also referred to as light curtains. More particularly, the application relates to light barriers where the light beam from an emitter to a receiver is redirected by one or more mirrors prior to impinging on the receiver.

BACKGROUND

Light curtains comprise one or more pairs of emitters and receivers of light, typically emitters and receivers of invisible light, specially infrared light, wherein the light beam emitted by the emitter of a pair is directed to the corresponding receiver of the pair and an interruption of the light beam is detected using the receiver. Such light barriers are widely used for presence detection, in particular for safety purposes, e.g. for deactivating machinery with potential to cause bodily harm to a human entering a hazard zone.

Light barriers where the light beam from an emitter to a receiver is redirected by one or more mirrors prior to impinging on the receiver advantageously permit a presence detection along a perimeter that is not a straight line, where it would otherwise be necessary to install a light barrier for each straight segment of the perimeter.

These mirrors, as well as the optical elements determining the optical path of a beam from an emitter to a receiver, should be precisely adjusted to safeguard that the emitted light indeed hits the receiver, as is preferable for a proper functioning of the light barrier. As mirrors in the optical path from the emitter to the receiver also act as apertures limiting the beam diameter, it is usually difficult to correctly align an emitter and a receiver, if the projected light beams are invisible. To address this problem, laser pointers arranged at the emitter or receiver units of a light barrier are traditionally used for alignment purposes. If they are arranged to coincide or be parallel to infrared light beams of the light barrier, the position at which they hit a mirror or the receiver correlates with the position on which the infrared light beam impinges and, accordingly, the mirror and/or the receiver can be adjusted with reference to the reflection of the visible laser beam.

A light barrier of this kind is described in EP 1437542 B1, which is incorporated by reference into this disclosure. According to this document, laser diodes emitting visible light are provided at fixed positions in a housing comprising the emitters of the light barrier. In order to align the emitters and receivers of the light barrier, the visible beams emitted by these laser diodes are aligned with a target mark on the receiving unit comprising the receivers of the light barrier. In a realization wherein the beams from the emitter to the receiver are redirected by mirrors, such a target mark is also provided on the redirecting mirrors and each mirror is adjusted in such a way that the visible light beams hit these target marks.

Laser pointers have the advantage that they can be precisely directed and create a high intensity spot of reflected light on the surface of an object, which is easily discernible and very well suitable for alignment purposes. The low diameter of laser beams, however, implies that the light spot created on a target has a very small diameter, which is typically smaller than the targets employed in the alignment process. In light barriers where individual redirecting mirrors are assigned to different emitter/receiver pairs and, accordingly, an alignment beam created by a laser diode needs to be used for each of these pairs, it can be difficult to properly align all laser beams at the same time, if the emitters and the receivers each are arranged in a common housing, as each laser beam not only has to be aligned with the mirrors and target marks, but also with all other laser beams. Individual beams may be steered differently by their respective mirrors and small misalignments may prevent the laser beams associated with different emitter/receiver pairs from simultaneously impinging on the respective mirrors.

SUMMARY

One aspect of the disclosure is directed to a light barrier system, which comprises one or more pairs of an emitter of light, including invisible light, and a corresponding receiver. In an operative state of the system a light beam emitted by the emitter of a pair is directed to the corre-sponding receiver of the pair and detected by this receiver and the system is configured to detect an interruption of the light beam from the emitter of a pair to the corresponding receiver. At least one of the pairs is associated with an optical alignment element, which is arranged in a fixed spatial relation to the emitter of the pair and configured to emit a beam of incoherent visible light having a predetermined orientation with regard to a beam of light emitted by the emitter of the pair, such that the visible light beam emitted by the optical alignment element covers a predetermined target area if the light beam emitted by the emitter impinges on the corresponding receiver of the pair. The beam of visible light emitted by the optical alignment element has a divergence less than or equal to the divergence of the light beam emitted by the emitter of the pair.

In a related aspect, a unit comprising one or more light emitters for a light barrier system has one or more pairs of an emitter of light and a corresponding receiver. In an operative state of the system a light beam emitted by the emitter of a pair is directed to the corresponding receiver of the pair and detected by this receiver and the system is configured to detect an interruption of the light beam from the emitter of a pair to the corresponding receiver; wherein the emitter or emitters are arranged in the unit. At least one of the emitters in the unit is associated with an optical alignment element, which is arranged in the unit in a fixed spatial relation to the emitter and configured to emit a beam of incoherent visible light having a predetermined orientation with regard to a beam of light emitted by the associated emitter, such that the visible light beam can impinge on a unit of the system comprising the corresponding receiver or on a reflective target in a fixed spatial relation to the unit comprising the corresponding receiver, when the light beam emitted by the emitter impinges on the receiver of the respective pair. The beam of visible light emitted by the optical alignment element has a divergence less than or equal to the divergence of the light beam emitted by the emitter with which it is associated.

A method for aligning an emitter and a receiver in a light barrier system according to a related aspect includes: placing one or more retroreflective elements in a vicinity of the receiver such that a beam of visible light emitted by an optical alignment element impinges on a retroreflective element when the light beam emitted by the emitter impinges on the receiver; activating the optical alignment element to emit a beam of visible light; and adjusting optical components of the system so that the visible beam emitted by the optical alignment element impinges on and is reflected by the retroreflective element.

DETAILED DESCRIPTION

Figure 1:
FIG. 1 illustrates an alignment problem that arises when laser beams are to be aligned with redirecting mirrors in a light barrier system.

In order to address the aforementioned challenges, as well as related challenges, aspects of this disclosure provide a light barrier system comprising one or more pairs of an emitter of light, in particular invisible light, and a corresponding receiver, wherein in an operative state of the system a light beam emitted by the emitter of a pair is directed to the corresponding receiver of the pair and detected by this receiver and the system is configured to detect an interruption of the light beam from the emitter of a pair to the corresponding receiver. The light beam emitted by an emitter of a pair, to be detected by the receiver of the pair, will hereinafter also be referred as the operative light beam. The interruption which the system is configured to detect may be a complete or a partial interruption, i.e. the system may be configured to detect a complete interruption, it may be configured to detect a partial interruption, or it may even be configured to detect a complete interruption for some pairs and a partial interruption for others.

In the system according to a related aspect, at least one of the pairs, in particular realizations of the invention each pair, is associated with an optical alignment element, which is arranged in a fixed spatial relation to the emitter of the pair and which may especially be arranged in a unit of the system comprising the optical alignment element in a fixed spatial relation to the emitter. This optical alignment element is configured to emit a beam of incoherent visible light, hereinafter also referred to as the alignment beam, having a predetermined or fixed orientation with regard to a beam of light emitted by the emitter of the pair with which it is associated, i.e. an operative light beam of this pair, such that the visible light beam emitted by the optical alignment element covers a predetermined target area, if the operative light beam emitted by the emitter impinges on the corresponding receiver of the pair, wherein the beam of visible light emitted by the alignment element has a divergence smaller than or equal to the divergence of the operative light beam emitted by the emitter of the pair. In certain implementations of the system, the beam of incoherent visible light, i.e. the alignment beam, and the operative light beam may be parallel to each other.

The predetermined target area may be an area on a surface of an object, especially a reflective target area of a unit comprising the receiver of the pair, such as a receiver unit, or of a target object separate from the receiver or a corresponding receiver unit that is arranged in a fixed spatial relation to the receiver and which may have a retroreflective surface or carry retroreflective elements. Generally, however, the target area does not need to be an area on a physical surface or on a physical object, but can just be a region in space that is in a given spatial relation to the receiver where a surface of a target object may be placed or a surface of a unit comprising the receiver is located.

In a related aspect the emitter or emitters are arranged in an emitter unit and/or the corresponding receiver or receivers are arranged in a receiver unit.

In related embodiments, emitters and receivers, in a specific embodiment all emitters and receivers of a light barrier, may be arranged in a common unit. It can be provided that this common unit provides a common housing for the emitters and receivers in this unit. In such embodiments the emitter and the receiver of a pair may be comprised in different units, each comprising both emitters and receivers, or the emitter and receiver of a pair may be comprised in the same common unit. In the latter case the operative light beam emitted by the emitter is redirected back to the common unit by a reflective or refractive element, in particular by a mirror or a prism, so as to impinge on the receiver of the pair.

In a specific implementation of the system, some or all emitters are mounted in a fixed spatial relation to each other and/or some or all of the receivers are mounted in a fixed spatial relation to each other. Especially some or all emitters mounted in an emitter unit or a common unit comprising emitters and receivers may be mounted in a fixed spatial relation to each other and/or to the housing of the emitter unit or common unit and/or some or all of the receivers mounted in a receiver unit or a common unit comprising emitters and receivers may be mounted in a fixed spatial relation to each other and/or to a housing of the receiver unit or common unit.

In an embodiment of the invention, the light barrier system is designed to detect a complete interruption of the light beam from the emitter of a pair to the corresponding receiver. In alternative embodiments the system may be designed to detect a partial interruption of the light beam from the emitter of a pair to the corresponding receiver. In specific embodiments an interruption is detected by detecting whether the output of the receiver is below a predetermined threshold. For a given system it may be provided that this threshold can be set to different values. Depending on the set threshold, an interruption is detected when the operative light beam is only partially interrupted or when it is completely interrupted. In case of a lower threshold, the system may only detect an interruption, if the operative light beam is completely blocked and thus completely interrupted, whereas in case of a higher threshold the system will detect that the operative light beam has been partly blocked.

The invention may provide that the alignment element comprises at least one light source of visible light, preferably an LED emitting visible light, in particular red light, and one or more optical components for defining properties of the beam of incoherent visible light. Such properties may, in particular, be its shape and/or the intensity distribution over a cross-section of its cone. In particular, the optical components may be designed so as to provide a homogeneous light spot on the receiver or another object in the optical path of the beam of incoherent visible light, i.e. the alignment beam.

According to a specific implementation the one or more optical components of the alignment element comprise a collimating lens, a prism, an aperture and/or a reflector. In specific realizations a reflector is arranged before a collimating lens in the optical path of the light beam.

In a similar way as with the alignment element the emitter of the respective emitter/receiver pair may comprise at least one light source and one or more optical components for determining properties of the operative beam, for example its shape. In respective implementations of the system, the optical components of the emitter of the pair and the optical components of the alignment element associated with the pair are integrated in a unitary part. This may especially be a unitary molded part, which has, for example, been molded by injection molding.

In a related embodiment, the emitter and the alignment element are arranged in a common optical unit, which comprises apertures for emitting the operative light beam and the alignment beam, respectively.

In a related embodiment, the light source of the emitter of the pair and the light source of the associated alignment element are mounted in a predetermined spatial relation on the same printed circuit board.

According to some realizations of the system the cone of the alignment beam, i.e. the beam of visible light emitted by the alignment element, is comprised in the cone of the operative light beam emitted by the emitter of the pair, in particular in the cone of a beam of invisible light emitted by the emitter of the pair. In this regard, the invention may provide that at a distance that is equal to or longer than a defined threshold distance the cone of the alignment beam is located inside the cone of the operative light beam. This threshold distance may be a distance shorter than the length of the optical path from the emitter to the receiver or a distance from the emitter unit that is smaller than the distance to the first mirror in the optical path of the beams or, in the absence of a mirror, than the distance to the receiving unit. Preferably, the threshold distance is less than or equal to the minimum operative distance of the system. In certain implementations, it may, however, be larger than the minimum operative distance. The minimum operating distance, often explicitly defined as such in the operating manual of a light barrier, is the minimum distance at which the light barrier operates correctly, being able to detect the interruption of one or more light beams. Whereas it is preferable that the cone of the alignment beam is located inside the cone of the operative light beam at distances greater or equal to this minimum operative distance and, accordingly, this threshold distance is less than or equal to the minimum operative distance, in practical applications it is frequently sufficient and easier to realize technically if this is only the case for distances larger than this minimum operative distance, but less than the length of the optical path from the emitter to the receiver or less than the distance to the first mirror in the optical path of the beams, as the case may be.

In some embodiments, the semi-angle of divergence of the beam of visible light emitted by the alignment element is greater than 0,05°, especially greater or equal to 0,75° and, in a specific realization 1° or more. It may especially have a divergence of about 1°. By way of comparison, the semi-angle of divergence of the cone of an operative light beam for the light barrier may be about 2°. The semi-angle of divergence is measured between the center axis of the beam and a straight line from the light source to a point on the circumference of the cone.

The system may comprise one or more mirrors for redirecting the invisible light beam in the optical path from the emitter of one or more emitter/receiver pairs to the corresponding receiver, in particular realizations in the optical path from the emitter to the corresponding receiver of each of the pairs.

In some embodiments, for each emitter/receiver pair one or more dedicated mirrors are provided in the optical path of the invisible beam from the emitter to the receiver, which can be adjusted independently of the mirrors redirecting the light beam originating from the emitters of other pairs.

In a system according to a related aspect, all emitter/receiver pairs can be associated with a dedicated optical alignment element in the way described before. In particular in implementations where some or all emitters in an emitter unit or in a common unit, also comprising one or more receivers, are mounted in a fixed spatial relation to each other, only one or some of the emitters mounted in this fixed spatial relation may be associated with a dedicated alignment element as described above, since the alignment of the beam of one or some emitters with a fixed spatial relation to each other with the corresponding receivers causes the alignment of the beam of the remaining emitters, if the corresponding receivers are in a corresponding spatial relation to the emitters, especially in a fixed spatial relation. Related aspects may also provide for several groups of emitters, wherein the emitters in a group are in a fixed spatial relation with each other, and for aligning the groups of beams emitted from the different groups of emitters independently from each other.

Aspects of the disclosure may also provide an emitter unit for a light barrier system, which system comprises one or more pairs of an emitter of light and a corresponding receiver, which may in particular be one or more pairs of an emitter of invisible light and a corresponding receiver, wherein in an operative state of the system a light beam emitted by the emitter of a pair is directed to the corresponding receiver of the pair and detected by this receiver and the system is configured to detect the partial interruption or the complete interruption of the light beam from the emitter of a pair to the corresponding receiver, wherein an emitter or emitters for the system are arranged in the emitter unit, wherein at least one of the emitters in the emitter unit, in particular realizations each emitter, is associated with an optical alignment element, which is arranged in the emitter unit in a fixed spatial relation to the emitter and configured to emit a beam of incoherent visible light having a predetermined or fixed orientation with regard to a beam of light emitted by the associated emitter and being preferably parallel to the same, such that the visible light beam can impinge on a receiver unit of the system comprising the receiver or receivers corresponding to the emitter or emitters or on a reflective target in a fixed spatial relation to this receiver unit, when the light beam emitted by the emitter impinges on the receiver of the respective pair, wherein the beam of visible light emitted by the alignment element has a divergence less than or equal to the divergence of the light beam emitted by the emitter with which it is associated.

In a related aspect, an emitter and receiver unit for a light barrier system, which system comprises one or more pairs of an emitter of light and a corresponding receiver, which may in particular be one or more pairs of an emitter of invisible light and a corresponding receiver, wherein in an operative state of the system a light beam emitted by the emitter of a pair is directed to the corresponding receiver of the pair and detected by this receiver and the system is configured to detect the partial interruption or the complete interruption of the light beam from the emitter of a pair to the corresponding receiver, wherein an emitter or emitters of the system and one or more receivers of the system are arranged in the emitter and receiver unit, wherein at least one of the emitters in the emitter and receiver unit, in particular realizations each emitter, is associated with an optical alignment element, which is arranged in the emitter and receiver unit in a fixed spatial relation to the emitter and configured to emit a beam of incoherent visible light having a predetermined or fixed orientation with regard to a beam of light emitted by the associated emitter, i.e. the operative beam emitted by this emitter, and being preferably parallel to the same, such that the visible light beam can impinge on a unit of the system comprising the receiver or receivers corresponding to the emitter or emitters or on a reflective target in a fixed spatial relation to the unit comprising the receiver or receivers, when the light beam of the emitter impinges on the receiver of the pair comprising this emitter, wherein the beam of visible light emitted by the alignment element has a divergence less than or equal to the divergence of the light beam emitted by the emitter with which it is associated.

In a related aspect, a method for aligning an emitter and a receiver of a pair of an emitter and a receiver in a light barrier system as described above, which comprises: placing one or more retroreflective elements on or in the vicinity of the receiver such that the beam of visible light emitted by the alignment element impinges on the retroreflective element or on one or more of the retroreflective elements when the receiver and the emitter of the corresponding pair are aligned, especially placing one or more retroreflective elements on the unit comprising the receiver in the target area of the visible beam, which target area corresponds to an area of the unit on which the beam of visible light impinges when the light beam emitted by the emitter impinges on the receiver of the respective pair, activating the alignment element to emit a beam of visible light, adjusting optical components so that the visible beam impinges on and is reflected by the retroreflective element or one or more of the retroreflective elements.

The unit comprising the receiver may be a unit comprising only receivers of the system or it may be a unit comprising receivers and emitters of the system. In embodiments of the system where the operative light beam is redirected by a refractive or reflective light directing element, such as mirror or a prism, this may especially be the same unit which comprises the corresponding emitter.

The retroreflective elements may be attached to the unit comprising the receiver in a temporary fashion so that they can be removed after the alignment process or in a permanent fashion so as to form a permanent part of this unit. For a temporary attachment, the retroreflective elements may be attached by clamps, using a friction mechanism, using a glue that allows easy detachment and re-attachment in the fashion of a sticky note and the like.

The retroreflective element or elements do not necessarily have to be attached to the unit comprising the receiver. They may also be comprised in or attached to a separate element that can be placed in a fixed spatial relation to the unit comprising the receiver in the vicinity thereof such that the visible beam emitted by the alignment element, i.e. the alignment beam, impinges on one or more retroreflective elements, when the receiver and the emitter of the corresponding pair are aligned so that a light beam emitted by the emitter will impinge on the receiver. For example, the retroreflective element or elements may be part of a screen that is mounted in front of or on the unit comprising the receiver in a fixed spatial relation to the receiver, wherein this screen may have a hole or a transparent portion at a location corresponding to the receiver so that the operative light beam can pass this screen and impinge on the receiver.

Adjusting optical components may comprise adjusting the light directing elements of the system, which redirect light beams that have been emitted by the respective light source by reflection and/or refraction, such as mirrors, prisms or lenses, and/or the units comprising emitters and/or receivers, such as the emitter units, receiver units or common units mentioned previously. In implementations wherein the components carrying an emitter or emitters and/or the components comprising a receiver or receivers can be individually adjusted, independently of other components, carrying different emitters or receivers, adjusting optical components may comprise adjusting components carrying an emitter or a receiver of a pair that has an alignment element associated with it, especially orienting such components independently from other components carrying emitters or receivers, respectively. Where the emitter is not comprised in the same component as the alignment element, a corresponding adjustment of the alignment element may be required.

Where the emitters and/or receivers are comprised in an emitter unit, a receiver unit or a common unit comprising emitters and receivers, as described above, components carrying an emitter or emitters or carrying a receiver or receivers may be individually adjustable, independently of other components in this unit, carrying different emitters or receivers, In implementations where a plurality of emitter/receiver pairs or all of them are each associated with a dedicated optical alignment element, the optical components are adjusted in a way that each of the visible beams emitted by an alignment element associated with a pair impinges on and is reflected by the retroreflective element or elements associated with the receiver of the respective emitter/receiver pair, when the light beam emitted by the emitter impinges on the corresponding receiver. The adjustment of optical components related to different emitter/receiver pairs may happen concurrently or subsequently to each other.

The invention may provide that one or more retroreflecting elements are placed in the vicinity of the receiver of the pair associated with the optical alignment element, especially adjacent to it.

It may in particular be provided that retroreflecting elements are placed at two opposite sides of the receiver, especially at a distance smaller than the diameter of the cone of the alignment beam at the position of the receiving unit or the diameter of the spot created by the alignment beam at the side of the receiving unit carrying the receivers.

According to specific implementations, one or more or all of the retroreflecting elements are retroreflective sheets, especially microprismatic sheets.

Where the light barrier system comprises one or more mirrors for redirecting the operative light beam in the optical path from the emitter of one or more of the pairs, especially each of the pairs, to the corresponding receiver, adjusting the light directing elements may comprise adjusting the position and orientation of the mirrors.

According to specific implementations, adjusting the light directing components comprises placing one or more retroreflective elements at or adjacent to an intermediate target position associated with a mirror, which is a position that the beam of visible light traverses when the emitter of the pair and the corresponding receiver are aligned so that a light beam emitted by the emitter impinges on the receiver.

The intermediate target position may be a position which the alignment beam, i.e. the beam of visible light emitted by the optical alignment element, traverses prior to impinging on the mirror and without being redirected prior to impinging on the mirror, having traversed this position, when the emitter of the pair and the corresponding receiver are aligned, or a position the visible alignment beam traverses after having been reflected by the mirror and without being redirected prior to traversing the intermediate target position after having been reflected by the mirror, when the emitter of the pair and the corresponding receiver are aligned or a position on the mirror on which the alignment beam impinges when the emitter of the pair and the corresponding receiver are aligned.

In a system wherein for each emitter/receiver pair one or more dedicated mirrors are provided in the optical path of the operative light beam from the emitter to the receiver, which can be adjusted independently of the mirrors redirecting the light of the emitters of other pairs, adjusting the light directing elements may comprise adjusting the mirrors associated with an emitter/receiver pair, especially adjusting the position and/or orientation of these mirrors, independently from those mirrors associated with other pairs.

The invention further provides for the use of one or more retroreflecting elements in a method as described above or in the appended claims.

In this use, one or more or all of the retroreflecting elements may be retroreflective sheets, especially microprismatic sheets.

The inventors have realized that a misalignment of the laser spots created with regard to a target or a target mark, as illustrated in FIG. 1, does not necessarily mean that the operative light beams, i.e. the light beams emitted by the emitters of the emitter/receiver pairs, do not hit the receiver. This is because the diameter of the operative light beams is much larger than that of laser beams, especially at a larger distance. Accordingly, even if a laser spot is misaligned with the respective mirror, as indicated in FIG. 1, this does not mean that the corresponding operative beam is misaligned with the mirror, as, due to the larger diameter, a considerable part of it may still hit the mirror and be reflected to the respective receiver. The inventors furthermore found a way to dispense with the use of a laser or a laser diode, which so far was necessary to create a clearly discernable light spot on a surface that can be used for alignment purposes. Due to the very high radiance of laser light, it may be collimated to a beam with very low divergence and small cross section, so that even when it is reflected by a diffusely reflecting or light scattering surface, it will produce a spot with relatively high energy density. In contrast, light produced by a source of lower radiance will always have a larger divergence and a larger cross-section, so that impinging on a diffusely reflecting surface leads to a relatively low energy density spot. The inventors recognized that this disadvantage of lower radiance sources can be overcome, if the target surface is retroreflecting. Retroreflecting material reflects light back in the direction it has come from, with only little angular spread. This results in a high gain that makes the reflection of the beam visible. According to the present invention a source of visible light is used to create an alignment beam that due to its larger divergence has a much larger diameter than a laser beam when it impinges on a mirror or on a target surface at the receiving unit. Using suitable optics for the source of visible light it is possible to tailor the alignment beam in such a way that it has a smaller divergence than the operative light beam emitted by the emitters of the emitter/receiver pairs. Accordingly, if the optical alignment element emitting the alignment beam is arranged in a fixed position with regard to the associated emitter there is a specific target point on the receiving unit that corresponds to the receiver of the emitter/receiver pair in the sense that if the visible light of the alignment beam hits this target point, the operative light beam hits the receiver. If the divergence of the alignment beam is smaller than the divergence of the operative light beam it is safeguarded that if the alignment beam covers a target point, the operative light beam hits the receiver. In particular, if the cone of the alignment beam is entirely comprised in the cone of the operative light beam at the location of the receiver, the operative light beam always hits the receiver if the receiver is hit by the alignment beam. As the expected residual misalignments are smaller than the divergence of the alignment beam, a scenario where the alignment beams incorrectly indicate a misalignment of the operative light beams created by the emitters is unlikely to occur. An added advantage is that the safety issues associated with laser light are avoided. A user can, for example, look directly at the visible alignment beam or its source to rapidly understand the orientation of a mirror. Accordingly, the system does not require labeling and warning. An LED emitting visible light as the light source for the alignment beam also comes cheaper than a laser or a laser diode.

Turning now to the figures, FIG. 1 illustrates a scenario in which four laser beams slightly deviate from the respective target points and from a common plane, as may happen in practice. The left side of FIG. 1 shows points that are created by the laser beams and the right side shows these laser points together with the respective mirrors by which they are supposed to be reflected. These mirrors are aligned on a straight line. One can see that the positions of laser spots are shifted with regard to the center of the mirrors and that it was not possible to align the fourth laser spot with the respective mirror simultaneously with the other three laser spots.

In consequence, light barriers with multiple mirrors for redirecting the beams of different emitter/receiver pairs are not easy to adjust in practice.

Figure 2:
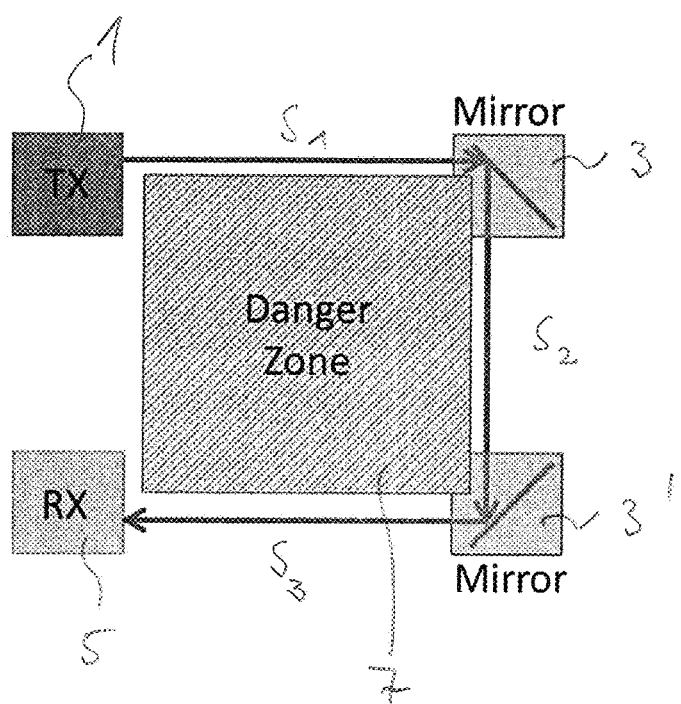
FIG. 2 shows a schematic diagram illustrating the basic arrangement of a light barrier system with multiple redirecting mirrors according to an aspect of the disclosure.

FIG. 2 illustrates the basic concept of a light barrier with redirecting mirrors. An emitter unit 1 comprises a plurality of emitters of infrared light and emits a plurality of parallel invisible light beams, which are redirected by mirrors 3 and 3' so that each impinges on a corresponding receiver comprised in a receiving unit 5. The line segments $S_1$, $S_2$ and $S_3$ between the emitting unit and the first mirror 3, the first mirror 3 and the second mirror 3' and the second mirror 3' and the receiving unit 5, respectively, surround a danger zone 7 and effectively constitute three light barriers at three sides of the danger zone, each consisting of a plurality of parallel beams. If a light beam or, as the case may be, a sufficient number of light beams are completely or partially interrupted in any of the line segments $S_1$, $S_2$ or $S_3$, the light barrier will sense the presence of an object at the perimeter of the danger zone and cause an appropriate response, such as switching off a machine in the danger zone. Whereas this is not illustrated in the schematic diagram of FIG. 1, in specific realizations the mirrors 3 and 3' consist of a plurality of individual mirrors which can be adjusted independently from each other, wherein each of this plurality of mirrors is assigned to a specific emitter/receiver pair and reflects light coming from the emitter of this pair. Accordingly, each infrared light beam from an emitter to a receiver in the light barrier is redirected by dedicated mirrors and each infrared light beam can therefore be adjusted independently from the other infrared light beams by adjusting the respective dedicated mirrors.

Figure 3:
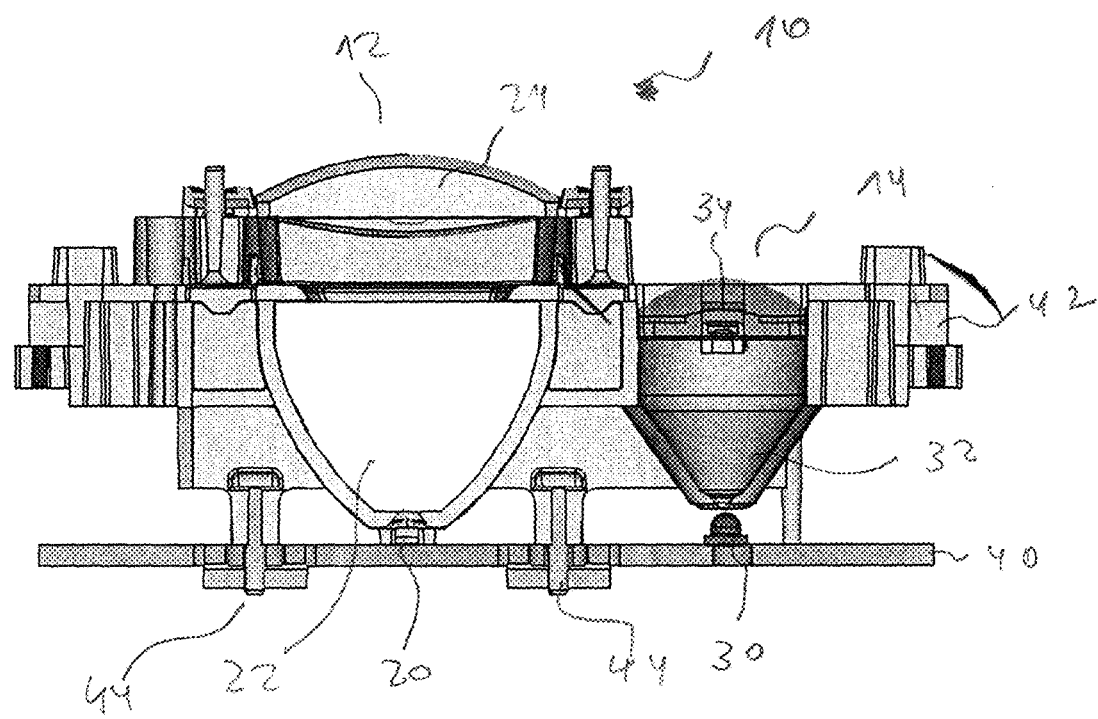
FIG. 3 illustrates an optical component comprising an emitter of infrared light and an alignment element emitting visible light according to some embodiments.

FIG. 3 illustrates an optical component 10 comprised in an emitter unit 1, which comprises an emitter of infrared light 12 and an alignment element 14 emitting a beam of visible light. The emitter 12 comprises an IR diode 20, an optical chamber 22 and a lens 24 for shaping the emitted infrared light beam of emitter 12. Likewise, the alignment element 14 comprises an LED 30 emitting visible light, for example red light, an optical chamber 32 receiving the emitted light and a collimating lens 34 for shaping the alignment beam of visible light. The inner walls of the cavities 22 and 32 may have a reflecting inner surface, especially a directly reflecting inner surface. They can serve as reflectors reflecting light to the respective lenses 24 and 34 and/or for removing stray light by multiple reflections. To the extent they serve for removing stray light, they may also have high light absorbing properties in the relevant portions. For example, they can be glossy black. The IR diode 20 and the LED 30 are mounted on the same printed circuit board 40 in a fixed spatial relation to each other, as may be determined by the structure and design of the printed circuit board. The optical elements associated with the IR diode 20 and the LED 30 are part of a unitary component 42, which, together with the lenses 24 and 34, defines the supporting structure both for the emitter 12 and the alignment element 14 and especially defines the optical chambers 22 and 32 as well as the holder for the lenses 24 and 34. Preferably, component 42 is manufactured by a molding process, such as injection molding. Accordingly, the optical elements associated with the IR diode 20 and the optical elements of the alignment element 14 have a precisely defined spatial relation to each other. The unitary component 42 is mounted by means of suitable fastening elements 44 to the printed circuit board 40. Due to this construction the components of the emitter 12 and the alignment element 14, i.e. the IR diode 20, the chamber 22 and the lens 24, on the one hand, and the LED 30, the chamber 32 and the lens 34, on the other hand, are in a well-defined spatial relation to each other and, accordingly, the IR beam emitted by the emitter 12 and the visible alignment beam emitted by the alignment element 14 are precisely aligned with each other, within the tolerances of the manufacturing process. The positioning errors of the main optical features are therefore reduced to errors in the unitary component 42, which especially in case of injection molding are very small and repeatable. Additionally, selecting an LED with an emitting area that is larger than the expected mechanical tolerances will prevent a malfunction due to wrong alignment. In a specific realization, the cone of the alignment beam emitted by the alignment element 14 is comprised within the cone of the infrared beam emitted by the emitter 12 at a sufficient distance from the emitting unit 1, which is smaller than the distance to mirror 3 and, accordingly, smaller than the length of the optical path to mirror 3' or to the receiving unit 5.

The precise alignment of the invisible infrared beam and the visible alignment beam allows for precisely adjusting the components of the light barrier system and safeguards that an alignment on the basis of visible alignment beams leads to an alignment of the invisible light beams between the emitter and receiver of emitter/receiver pairs.

Whereas only one optical component 10 is illustrated, it is to be understood that in the implementation that is shown and described here, all emitters 12 or at least all emitters 12 having an alignment element 14 associated with them are integrated in an optical component as shown in FIG. 3.

Figure 4:
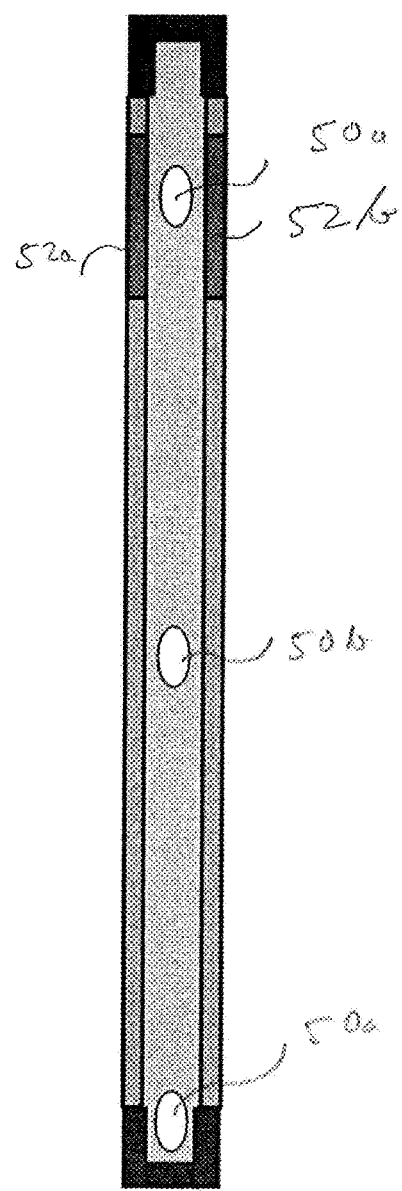
FIG. 4 schematically shows the front surface of a receiving unit with receivers and retroreflecting elements according to some embodiments.

FIG. 4 schematically shows the front side of receiving unit 5 according to one implementation during the alignment process. The receiving unit 5 comprise a plurality of receivers 50a, 50b and 50c that each have a corresponding emitter in the emitter unit 1. At the sides of the front surface of the receiving unit, two retroreflective stripes 52a and 52b are provided adjacent to the uppermost receiver 50a on both sides thereof. These retroreflective strips may consist of a microprismatic sheet. If during the alignment process the alignment beam is reflected by both retroreflective stripes 52a and 52b, the cone of the alignment beam covers the receiver 50a. As the cone of the alignment beam is comprised within the cone of the infrared beam emitted by the emitter 12, this means that the infrared beam is aligned with the receiver 50a in the horizontal direction. The alignment in the vertical direction can be verified by comparing the vertical extent of the spot created by the alignment beam on the retroreflective stripes 52a and 52b. If this spot extends above and below the receiver 50a, this means that the IR beam is also properly aligned with the receiver 50a in the vertical direction. In a modified realization, horizontal retroreflective stripes can be provided above and below the receiver 50a in addition to or instead of the retroreflective stripes 52a and 52b shown in FIG. 4. Whereas for ease of illustration retroreflective stripes 52a and 52b are only shown adjacent to receiver 50a, in practice such stripes will be provided for adjacent to each receiver 50a, 50b, 50c on both sides thereof when the invisible light beam to these receivers is to be aligned. Such retroreflective stripes may be provided for all receivers at the start of the alignment process for the light barrier, but they may also be applied individually during the alignment process for one or more specific receivers.

When the alignment process is completed, the stripes may be removed. As during normal operation the light source 30 of the alignment element 14 will be switched off, they may, however, also stay in place in an operative light barrier in case a readjustment becomes necessary.

Alternative configurations of the retroreflective stripes are possible and contemplated within the framework of the invention. For example, retroreflective stripes, like stripes 52a and 52b, can be provided along the entire length of the sides of the front surface of the reflecting unit so that all receivers are included between these two stripes. As described before, if the alignment beam is reflected by both opposite stripes at the level of the respective receiver 50, this means that the infrared beam is properly aligned. Other configurations may be easily envisaged by a person skilled in the art. For example, retroreflective material may also be attached to another object that in turn is glued, clamped or otherwise fixed to the receiving unit or that can be placed in a fixed spatial relation to the receiving unit in the vicinity thereof.

Figure 5:
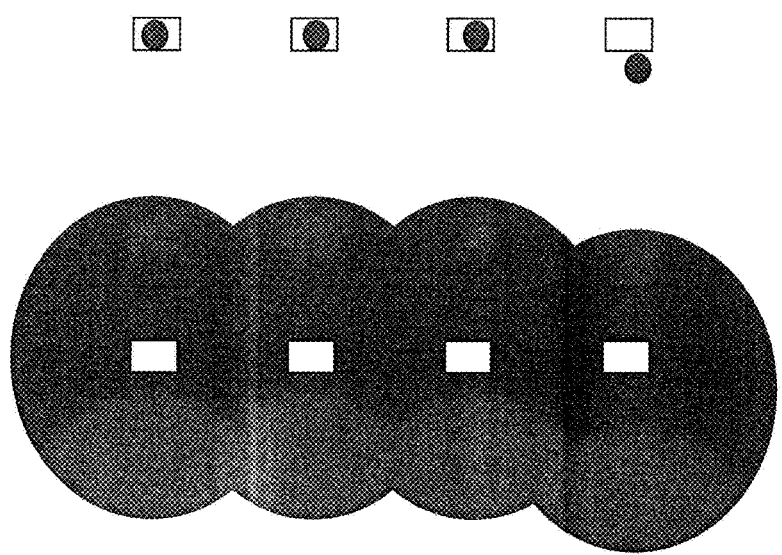
FIG. 5 shows a scenario with slight misalignments of the alignment beam, as illustrated in FIG. 1, according to some aspects.

FIG. 5 shows a comparison of the result of slight misalignments in case of a laser pointer and in case of the alignment elements according to the present invention. In the upper part of the drawing the misalignment of laser spots with regard to individual mirrors as shown in FIG. 1 is once more illustrated. In the lower picture a scenario is shown wherein the center line of the light cones of the alignment beams are misaligned in the same way as the laser beams in the upper picture. One can, however, easily recognize that due to the larger divergence of the alignment beams, they completely cover all four mirrors. As the divergence of the alignment beam is smaller than the divergence of the corresponding infrared beam and, in the specific realization described, the cone of the alignment beam is completely comprised in the cone of the infrared beam at the position of the mirror, this simultaneously means that the infrared beams are properly aligned with each of the mirrors. Accordingly, an operator is not forced to pinpoint each target, such as a mirror or a receiver, with a respective laser beam, but just has to be sure that the target is inside the much larger spot created by the LED 30.

Whereas in the examples described above with reference to the drawings the emitters were represented as emitting invisible infrared light, it is to be understood that these emitters may also emit other types of light, including light in the visible spectrum.

The features of the invention disclosed in the description, the claims and the drawings can be material for the realization of the invention both individually and in arbitrary combination with each other.

Additional Notes and Examples

Example 1 is a light barrier system, which comprises one or more pairs of an emitter of light, including invisible light, and a corresponding receiver; wherein in an operative state of the system a light beam emitted by the emitter of a pair is directed to the corresponding receiver of the pair and detected by this receiver and the system is configured to detect an interruption of the light beam from the emitter of a pair to the corresponding receiver wherein at least one of the pairs is associated with an optical alignment element, which is arranged in a fixed spatial relation to the emitter of the pair and configured to emit a beam of incoherent visible light having a predetermined orientation with regard to a beam of light emitted by the emitter of the pair, such that the visible light beam emitted by the optical alignment element covers a predetermined target area if the light beam emitted by the emitter impinges on the corresponding receiver of the pair, wherein the beam of visible light emitted by the optical alignment element has a divergence less than or equal to the divergence of the light beam emitted by the emitter of the pair.

In Example 2, the subject matter of Example 1 includes, wherein the optical alignment element comprises at least one light source and one or more optical components for defining properties of the beam of incoherent visible light, said components including a collimating lens, a prism, an aperture and/or a reflector.

In Example 3, the subject matter of Examples 1-2 includes, wherein the emitter of the emitter/receiver pair comprises at least one light source and one or more associated optical components for determining properties of the beam of light emitted by this emitter and wherein the optical components of the emitter of the pair and the optical components of the optical alignment element associated with the pair are integrated in a unitary part.

In Example 4, the subject matter of Examples 1-3 includes, wherein the light source of the emitter of the pair and the light source of the associated optical alignment element are mounted in a predetermined spatial relation on the same printed circuit board.

In Example 5, the subject matter of Examples 1-4 includes, wherein the cone of the beam of visible light emitted by the optical alignment element is comprised in the cone of the beam of invisible light emitted by the emitter of the pair at least at the predetermined target area.

In Example 6, the subject matter of Examples 1-5 includes, °.

In Example 7, the subject matter of Examples 1-6 includes, one or more mirrors for redirecting the light beam emitted by the emitter in the optical path from the emitter of one or more pairs to the corresponding receiver.

Example 8 is a unit comprising one or more light emitters for a light barrier system, which system comprises one or more pairs of an emitter of light and a corresponding receiver, wherein in an operative state of the system a light beam emitted by the emitter of a pair is directed to the corresponding receiver of the pair and detected by this receiver and the system is configured to detect an interruption of the light beam from the emitter of a pair to the corresponding receiver; wherein the emitter or emitters are arranged in the unit; and wherein at least one of the emitters in the unit is associated with an optical alignment element, which is arranged in the unit in a fixed spatial relation to the emitter and configured to emit a beam of incoherent visible light having a predetermined orientation with regard to a beam of light emitted by the associated emitter, such that the visible light beam can impinge on a unit of the system comprising the corresponding receiver or on a reflective target in a fixed spatial relation to the unit comprising the corresponding receiver, when the light beam emitted by the emitter impinges on the receiver of the respective pair, wherein the beam of visible light emitted by the optical alignment element has a divergence less than or equal to the divergence of the light beam emitted by the emitter with which it is associated.

Example 9 is a method for aligning an emitter and a receiver in a light barrier system, the method comprising: placing one or more retroreflective elements in a vicinity of the receiver such that a beam of visible light emitted by an optical alignment element impinges on a retroreflective element when the light beam emitted by the emitter impinges on the receiver; activating the optical alignment element to emit a beam of visible light; and adjusting optical components of the system so that the visible beam emitted by the optical alignment element impinges on and is reflected by the retroreflective element.

In Example 10, the subject matter of Example 9 includes, wherein one or more retroreflecting elements are placed in the vicinity of the receiver of emitter-receiver set that is associated with the optical alignment element, wherein retroreflecting elements are placed at two opposite sides of the receiver at a distance smaller than (a) a diameter of a cone of the visible beam at the position of the receiver, or (b) a diameter of a spot created by the visible beam at a side of the receiver.

In Example 11, the subject matter of Examples 9-10 includes, wherein one or more of the retroreflecting elements are retroreflective microprismatic sheets.

In Example 12, the subject matter of Examples 9-11 includes, wherein the light barrier system comprises one or more mirrors for redirecting the light beam from an emitter in the optical path from the emitter to the corresponding receiver and adjusting the light directing elements comprises adjusting the position and orientation of mirrors.

Example 13 is method according to Example 9, wherein for the emitter-receiver set, one or more dedicated mirrors are provided in the optical path of the beam from the emitter to the receiver, which dedicated mirrors are adjustable independently of mirrors redirecting the light of the emitters of other emitter-receiver sets, and adjusting the light directing elements comprises adjusting the mirrors associated with a given emitter-receiver pair independently from those mirrors associated with other sets.

The embodiments above are intended to be illustrative and not limiting. Additional embodiments are within each claim that does not expressly exclude such subject matter. In addition, although aspects of the present invention have been described with reference to particular embodiments, those skilled in the art will recognize that changes may be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

For purposes of interpreting the claims for the present invention, it is expressly intended that the provisions of 35 U.S.C. § 112(f) are not to be invoked unless the specific terms "means for" or "step for" are recited in a claim.

What is claimed is:

1. A light barrier system, which comprises one or more pairs of an emitter of light, including invisible light, and a corresponding receiver;
    wherein in an operative state of the system a light beam emitted by the emitter of a pair is directed to the corresponding receiver of the pair and detected by this receiver and the system is configured to detect an interruption of the light beam from the emitter of a pair to the corresponding receiver;
    wherein at least one of the pairs is associated with an optical alignment element, which is arranged in a fixed spatial relation to the emitter of the pair and configured to emit a beam of incoherent visible light having a predetermined orientation with regard to a beam of light emitted by the emitter of the pair, such that the visible light beam emitted by the optical alignment element covers a predetermined target area if the light beam emitted by the emitter impinges on the corresponding receiver of the pair, wherein the beam of visible light emitted by the optical alignment element has a divergence less than or equal to the divergence of the light beam emitted by the emitter of the pair, and wherein the cone of the beam of visible light emitted by the optical alignment element is comprised in the cone of the beam of invisible light emitted by the emitter of the pair at least at the predetermined target area.

2. The system according to claim 1, wherein the optical alignment element comprises at least one light source and one or more optical components for defining properties of the beam of incoherent visible light, said components including a collimating lens, a prism, an aperture and/or a reflector.

3. The system according to claim 2, wherein the emitter of each emitter/receiver pair comprises at least one light source and one or more associated optical components for defining properties of the beam of light emitted by that emitter and wherein the optical components of the emitter of the pair and the optical components of the optical alignment element associated with the pair are integrated in a unitary part.

4. The system according to claim 3, wherein the light source of the emitter of the pair and the light source of the associated optical alignment element are mounted in a predetermined spatial relation on the same printed circuit board.

5. The system according to claim 1, wherein the semi-angle of divergence of the beam of visible light emitted by the optical alignment element is greater than 0,05°.

6. The system according to claim 1, comprising one or more mirrors for redirecting the light beam emitted by the emitter in the optical path from the emitter of one or more pairs to the corresponding receiver.

7. A unit comprising one or more light emitters for a light barrier system, which system comprises one or more pairs of an emitter of light and a corresponding receiver, wherein in an operative state of the system a light beam emitted by the emitter of a pair is directed to the corresponding receiver of the pair and detected by this receiver and the system is configured to detect an interruption of the light beam from the emitter of a pair to the corresponding receiver;
    wherein the emitter or emitters are arranged in the unit; and
    wherein at least one of the emitters in the unit is associated with an optical alignment element, which is arranged in the unit in a fixed spatial relation to the emitter and configured to emit a beam of incoherent visible light having a predetermined orientation with regard to a beam of light emitted by the associated emitter, such that the visible light beam can impinge on a unit of the system comprising the corresponding receiver or on a reflective target in a fixed spatial relation to the unit comprising the corresponding receiver, when the light beam emitted by the emitter impinges on the receiver of the respective pair, wherein the beam of visible light emitted by the optical alignment element has a divergence less than or equal to the divergence of the light beam emitted by the emitter with which it is associated, and wherein a cone of the beam of visible light emitted by the optical alignment element is comprised in a cone of the beam of invisible light emitted by the emitter of the pair at least at the predetermined target area.

8. The unit according to claim 7, wherein the optical alignment element comprises at least one light source and one or more optical components for defining properties of the beam of incoherent visible light, said components including a collimating lens, a prism, an aperture and/or a reflector.

9. The unit according to claim 8, wherein the emitter of each emitter/receiver pair comprises at least one light source and one or more associated optical components for defining properties of the beam of light emitted by that emitter and wherein the optical components of the emitter of the pair and the optical components of the optical alignment element associated with the pair are integrated in a unitary part.

10. The unit according to claim 9, wherein the light source of the emitter of the pair and the light source of the associated optical alignment element are mounted in a predetermined spatial relation on the same printed circuit board.

11. The unit according to claim 7, wherein the semi-angle of divergence of the beam of visible light emitted by the optical alignment element is greater than 0,05°.

12. The unit according to claim 7, wherein the reflective target includes a plurality of retroreflective stripes adjacent to the corresponding receiver such that the beam of visible light is reflected by each of the plurality of retroreflective stripes when aligned with the corresponding receiver.

13. The unit according to claim 12, wherein the plurality of retroreflective stripes include a pair of vertically oriented retroreflective stripes on opposing sides of the corresponding receiver.

14. The unit according to claim 12, wherein the plurality of retroreflective stripes include a pair of horizontally oriented retroreflective stripes on opposing sides above and below the corresponding receiver.

15. The unit according to claim 12, wherein the plurality of retroreflective stripes include a pair of vertical oriented retroreflective stripes and a pair of horizontally oriented retroreflective stripes adjacent the corresponding receiver.

* * * * *